United States Patent
Srivastava et al.

(10) Patent No.: US 7,194,744 B2
(45) Date of Patent: Mar. 20, 2007

(54) SYSTEM AND METHOD FOR DYNAMIC EXCEPTION HANDLING USING AN EXTERNAL EXCEPTION HANDLER

(75) Inventors: Biplav Srivastava, Delhi (IN); Amit A. Nanavati, New Delhi (IN); Vishal S Batra, Noida (IN); Manish A Bhide, New Delhi (IN); Pasumarti V Kamesam, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 10/321,018

(22) Filed: Dec. 17, 2002

(65) Prior Publication Data

US 2004/0117803 A1    Jun. 17, 2004

(51) Int. Cl.
G06F 9/44    (2006.01)

(52) U.S. Cl. .................. 719/331; 719/318; 719/332; 714/48

(58) Field of Classification Search ........... 719/310, 719/318, 330–332, 316; 714/37, 38, 48, 714/49; 712/200; 707/100; 717/107, 117, 717/137, 164
See application file for complete search history.

(56) References Cited

U.S. PATENT DOCUMENTS

| | | | | |
|---|---|---|---|---|
| 5,526,485 A * | 6/1996 | Brodsky | .................. | 714/38 |
| 5,606,696 A * | 2/1997 | Ackerman et al. | .......... | 718/108 |
| 5,628,016 A * | 5/1997 | Kukol | .................. | 717/140 |
| 5,682,535 A * | 10/1997 | Knudsen | .................. | 717/117 |
| 5,692,193 A * | 11/1997 | Jagannathan et al. | ....... | 718/106 |
| 5,732,270 A * | 3/1998 | Foody et al. | ............. | 719/316 |
| 5,761,407 A * | 6/1998 | Benson et al. | ............. | 714/37 |
| 5,778,369 A * | 7/1998 | Pascoe et al. | ............. | 707/100 |
| 5,911,069 A * | 6/1999 | Beard | .................. | 719/315 |
| 5,961,630 A * | 10/1999 | Zaidi et al. | ............. | 712/200 |
| 6,075,939 A * | 6/2000 | Bunnell et al. | ............. | 717/107 |
| 6,182,246 B1 * | 1/2001 | Gregory et al. | ............. | 714/38 |
| 6,247,169 B1 | 6/2001 | DeLong | | |
| 6,282,636 B1 | 8/2001 | Yeh et al. | | |
| 6,308,318 B2 * | 10/2001 | Krishnaswamy | ............. | 717/139 |
| 6,339,832 B1 * | 1/2002 | Bowman-Amuah | .......... | 714/35 |
| 6,349,343 B1 * | 2/2002 | Foody et al. | ............. | 719/316 |
| 6,421,740 B1 * | 7/2002 | LeCroy | .................. | 719/331 |
| 6,434,628 B1 * | 8/2002 | Bowman-Amuah | .......... | 714/48 |

(Continued)

OTHER PUBLICATIONS

Ogasawara et al. "A Study Of Exception Handling And Its Dynamic Optimization In Java", 2001, pp. 1-13.*

(Continued)

Primary Examiner—Van Nguyen
(74) Attorney, Agent, or Firm—Gibb I.P. Law Firm, LLC; T. Rao Coca, Esq.

(57) ABSTRACT

A method and a system for dynamically specifying exceptions and exception handlers for an application written in any computer language, which has exception handling facility, are described. The present decouples the exception handling logic from the application and thereby can be used to alter the behavior of the program/module/application as well as to define new types of exceptions at runtime. The decoupling of the exception handler logic eliminates the language dependence of the application and further helps in customizing the behavior of the application when they are being deployed in new environments. Moreover dynamic exception handling is not operating system dependent.

26 Claims, 8 Drawing Sheets

U.S. PATENT DOCUMENTS

| | | | |
|---|---|---|---|
| 6,493,834 B1* | 12/2002 | Bates et al. | 714/38 |
| 6,502,213 B1* | 12/2002 | Bowman-Amuah | 714/49 |
| 6,738,976 B1* | 5/2004 | Meshenberg et al. | 719/318 |
| 6,871,344 B2* | 3/2005 | Grier et al. | 717/162 |
| 6,883,172 B1* | 4/2005 | Angeline et al. | 719/315 |
| 6,901,588 B1* | 5/2005 | Krapf et al. | 717/164 |
| 6,948,095 B2* | 9/2005 | Phillips | 714/27 |
| 6,993,751 B2* | 1/2006 | Bhansali et al. | 717/137 |
| 7,080,366 B2* | 7/2006 | Kramskoy et al. | 717/148 |
| 7,089,540 B2* | 8/2006 | Ogasawara | 717/140 |
| 2002/0029299 A1* | 3/2002 | Kappel et al. | 709/318 |
| 2003/0200349 A1* | 10/2003 | Hansen | 709/315 |
| 2005/0093881 A1* | 5/2005 | Okita et al. | 345/589 |

OTHER PUBLICATIONS

Ryu et al. "Exception Analysis For Multithreaded Java Programs", 2001 IEEE, pp. 23-30.*

Borger et al. "A Practical Method For Specification And Analysis Of Exception Handling- A Java/JVM Case Study", 2000 IEEE, pp. 872-887.*

Buhr et al. "Advanced Exception Handling Mechanisms", 2000 IEEE, pp. 820-836.*

Sinha et al. "Criteria For Testing Exception-Handling MConstructs In Java Programs", 1999 IEEE, pp. 1-10.*

Dony "Improving Exception Handling With Objected-Oriented Programming", 1990 IEEE, pp. 36-42.*

Dony "Exception Handling And Objected-Oriented Programmin: Towards A Synthesis", 1990 ACM, pp. 322-330.*

"A study of the Applicability of Existing Exception-Handling Techniques to Component-Based Real-Time Software Technology" by Jun Lang and David B. Stewart, published in ACM Transactions on Programming Languages and Systems, vol. 20, No. 2, Mar. 1998 (pp. 274-301).

'Decisions with Multiple Objectives', R.L. Kenney and H. Raiffa, Cambridge University Press, Wiley, New York, 1976, pp. 283-343.

'Design and Implementation of an Intelligent Decision Analysis System for E-Sourcing', M. Bichler, J. Lee, C.H. Kim, and H.S. Lee, IBM Research Report, RC 22048(98946)30, Apr. 2001, 8 pages.

'Q-Eval: Evaluating Multiple Attribute Items Using Queries', V.S. Iyengar, J. Lee, and M. Campbell, ACM Electronic Commerce, EC01, Oct. 14-17, 2001, Tampa, Florida, USA, pp. 144-153.

'Design and Implementation of an Agent-Based Intermediary Infrastructure for Electronic Markets', G. Tewari and P. Maes, ACM Conference on Electronic Commerce, EC00, 2000, pp. 86-94.

'Negotiation Software Helps Work Out E-Commerce Details', E. Andren, Gartner Group Research Notes, ECEA, Jan. 9, 2001, 6 pages.

* cited by examiner

Figure 8 dler code. If the overriding method/class can be declared and loaded at runtime then this gives the flexibility to alter the behavior of the program at runtime as per the application's need.

SYSTEM AND METHOD FOR DYNAMIC EXCEPTION HANDLING USING AN EXTERNAL EXCEPTION HANDLER

FIELD OF THE INVENTION

The invention relates to the field of computer applications. More particularly the invention relates to a system and method for handling exceptions raised during the execution of the application.

BACKGROUND OF THE INVENTION

An Exception is an anomalous event that occurs during the runtime of a program and disrupts the normal flow of instructions. Many kinds of errors can cause software exceptions—problems ranging from resource unavailability like "File not found" to programming errors, such as trying to access an out-of-bounds array element. For example, in an object-oriented programming environment, an exception may occur when a particular object fails to operate in an expected manner. Without proper handling of the exception, the computer program may produce unexpected results and, moreover, may abruptly halt execution of the program. However, a skilled computer programmer is likely to account for such an exception via code, which services or handles the exception. This exception handling code also cleans up the memory used by an object. Thus, the program is able to use the exception handling code to recover from the failure and continue proper execution of the program or terminate gracefully.

Runtime errors or exceptions may be handled by in-built mechanisms provided by the programming language. Using a built-in exception-handling scheme, the exception is typically handled by code outside the normal flow of execution. Object oriented programming languages provide an exemplary built-in scheme for handling runtime errors or exceptions. In such languages the compiler implements exception handling using a TRY/CATCH paradigm. Essentially, a TRY statement is followed by a section of code where an exception may occur during execution of the code section. The process of raising an exception when the exception occurs in this code section is generally called "throwing" the exception. The "thrown" exception is "caught" or handled by a CATCH block of exception handling code. Within the CATCH block of code, the programmer can write code to take appropriate actions for handling the exception. This could include clearing memory associated with an object, which is no longer in use.

Exception handling schemes such as the TRY/CATCH approach are easy for computer programmers to implement. Computer programmers are able to take advantage of built-in exception handling schemes without having to spend time writing additional code to handle runtime errors or exceptions. These languages support a set of predefined exceptions. In addition to these predefined exceptions, the user can also define new exceptions during program development that get bound at compile time. The crucial thing about all these exceptions is that the exception types as well as their handlers have to be defined at compile time and cannot be changed later.

Object oriented programming languages like Java and C++ also support a mechanism to override methods and classes. A subclass can override a method in its super class by defining a method with the same name, return type, number and type of the parameters as that of the method in the super-class. This technique can be used to extend the functionality of the exception handlers by defining new methods/classes that override the exception handler code. If the overriding method/class can be declared and loaded at runtime then this gives the flexibility to alter the behavior of the program at runtime as per the application's need.

Current exception mechanisms require that all the types of exceptions that may occur during the execution of the program be known a priori at compile time. The error handling code is also defined at compile time, which precludes changing the error-handling behavior later at runtime.

"A study of the Applicability of Existing Exception-Handling Techniques to Component-Based Real-Time Software Technology" published in ACM Transactions on Programming Languages and Systems, Vol. 20, No. 2, March 1998 (pp. 274–301), discusses a strategy for error handling for component based real-time systems. The paper proposes a decentralized approach towards exception handling. However the paper has the limitation that the techniques described therein would either require an operating system support or a modification to the programming language thereby limiting the applicability.

U.S. Pat. No. 6,247,169 describes a structured exception-handling mechanism. The invention wraps the software code with one or more exception handling constructs that can be nested. In case the exception is not defined in the constructs then a provision for default handler outside the scope of the exception code is provided. The invention describes a language dependent architecture and also decouples the exception-handling behavior by providing a default exception beyond the lexical scope of the encapsulated code. It can not be used to customize the exception-handling behavior at run-time.

U.S. Pat. No. 6,282,636 provides a decentralized exception processing system for hardware. The patent describes a methodology wherein one or more local exception unit generates exception signals that are combined to generate global exceptions by a global unit. Though this patent does talk about decentralizing the exception handlers but total decoupling is not achieved as all local units report back to the global unit.

With the current set of programming languages, the exception types and handlers are tightly coupled at compile time, with the exception handling code being hard coded into the application. Not surprisingly, exception handlers and the program itself are implemented in the same language. Due to the tight coupling of the handlers with the program code, dynamic exception handling, i.e., specifying exception types and exception handler at runtime, has not been supported in any application or programming language. In this sense the behavior of the program is fixed at compile time.

However, in many situations there is a need to extend or change the behavior of the exception handler. This entails rewriting the exception handler code. This requires code maintenance and is not always feasible as the code may be from a legacy system or may not be available. The only way to change the exception handler behavior is to change the code, which requires recompilation of the code. Hence there is a need for a mechanism that changes the exception-handling behavior of the system at runtime that does not require code modification thereby overcoming the limitation of programming language support.

Hence there is a need for a mechanism for dynamic exception handling to solve the aforementioned problems. Some scenarios that exemplify the value of dynamic exception handling are:

a) Suppose one wants to tailor the behavior of a legacy component of an application to a new deployment domain. An example could be from a banking system that was so far used only by its employees and is now being deployed over the web, enabling direct access to the customers. The banking application could have a Customer Transaction module, which throws exceptions like "File locked exception". "Invalid access" etc. When the application is moved to the web then these exceptions should be mapped to more meaningful exceptions like "Account currently not available—please try later", "Maximum draft amount is 25,000" etc.

b) An online trading application could use different modules like credit card authorization module, inventory module etc. The credit card authorization module can throw various kinds of exceptions like "Invalid card number", "Card expired", "Transaction amount failure", "Invalid card expiry date" etc. Exposing the user to these exceptions will not be advisable from the security point of view. Hence the exception returned to the user should be non-committal rather than giving specific information about the type of the exception. Therefore there is a need to mask these exceptions into a single exception like "Credit Card Authorization Failure". In this way the credit card authorization module (provided by the credit card Company) can be reused in different applications by masking the exceptions as per the requirements of the application.

c) A different scenario is when an application has to be internationalized—i.e. made available in multiple languages. Here, the error messages may have to take into account the nuances of the target language or cultural differences in the expression. Hence, in such a scenario, the exceptions that are thrown by the application will have to be masked to a different exception depending on the type of language selected by the user.

d) Consider a distributed workflow. When a module raises an exception that it cannot handle, the exception is reported back to the workflow manager (initiator) who handles the exception and then restarts/resumes the workflow. Using dynamic exception handling, it is possible to enhance the capability of the module to handle the exception it was not designed to, and resume the workflow without the explicit intervention of the workflow manager. This improves the performance and throughput of the distributed system.

All the above examples illustrate the need to change/extend the behavior of a program at runtime.

SUMMARY OF THE INVENTION

The first object of the invention is to decouple the exception handling logic from the program code.

The second object of the invention is to provide the mechanism of dynamic exception handling without modifying the code of the program or shutting down the system hence overcoming the requirement of modifying the programming language as well as to provide exception handling in such an architecture so that the operating system dependence is not there.

To achieve the aforementioned objective of dynamic exception handling and to overcome the existing aforementioned drawbacks in exception handling, the invention provides for a methodology and an apparatus for dynamically specifying exceptions and exception handlers for any programming language that has support for exceptions. The decoupling of exception handling logic from the program code is described which is very useful in applications that are made up of different components, which may be reused in many applications. With exception handling logic decoupled from the program, the application can extend the exceptions thrown by the components to suit its needs. The exceptions and exception handlers can be specified at runtime. Further the behavior of the application can be altered at run time as well as external exception handlers can be plugged in as and when required. Moreover, this can be done without modifying the source code or bringing down the system and is also language independent. The invention will also be useful to customize the behavior of the system/applications when they are deployed in new environments. The invention can also be offered as a service in a distributed system.

BRIEF DESCRIPTION OF TILE DRAWINGS:

The novel features believed characteristic of the invention are set forth in the appended claims. The invention itself, however, as well as a preferred mode of use, further objectives and advantages thereof, will best be understood by reference to the following detailed description of an illustrative preferred embodiment when read in conjunction with the accompanying drawings, wherein:

DETAILED DESCRIPTION

Figure 1:
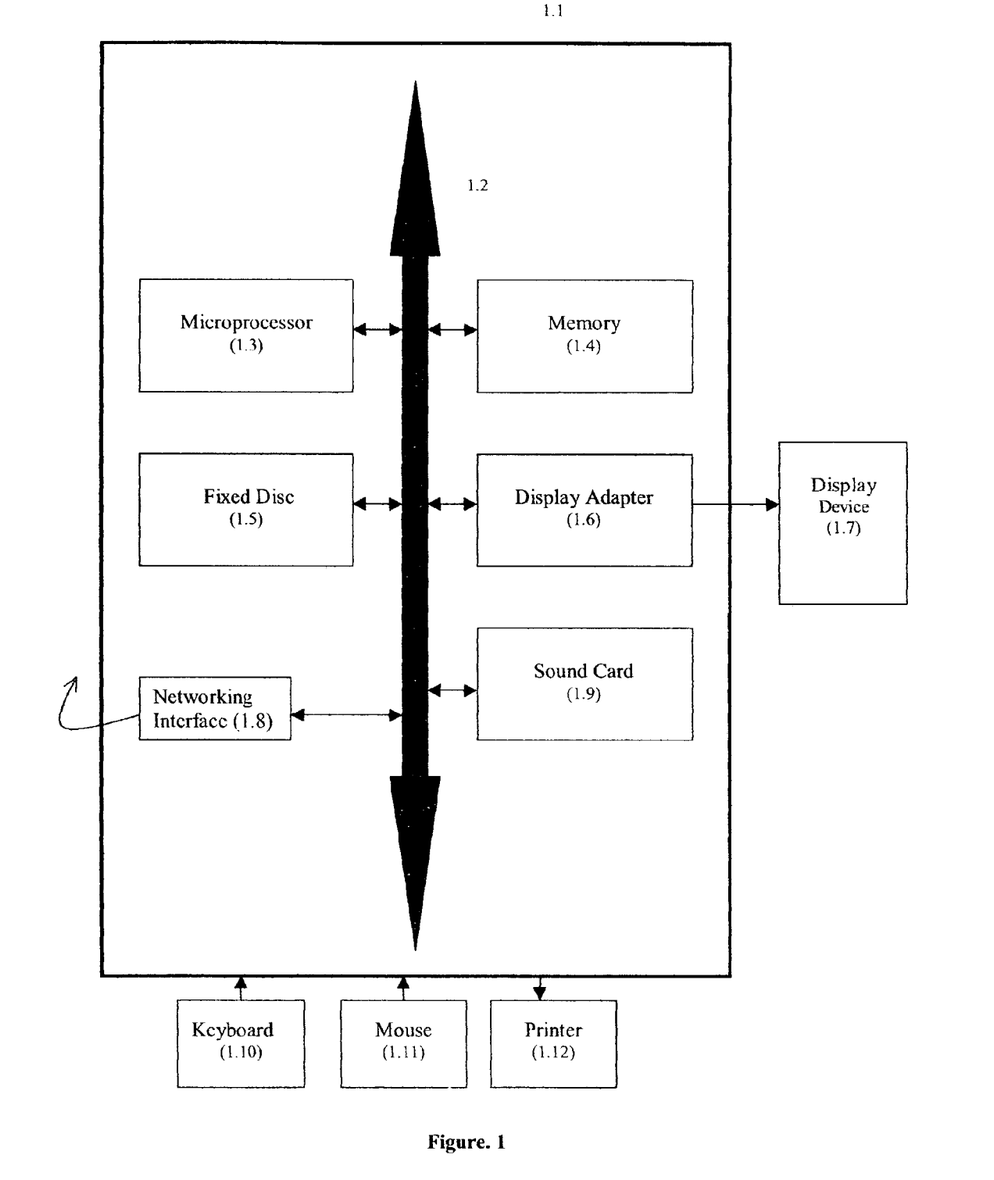
FIG. 1 shows the internal structure of the basic computing system on which the invention might be practiced.

FIG. 1 shows a block diagram of a general computing system (1.1) on which the invention might be practiced. The computer system (1.1) consists of various subsystems interconnected with the help of a system bus (1.2). The microprocessor (1.3) communicates and controls the functioning of other subsystems. The microprocessor (1.3) also acting as the control unit interacts with memory (1.4) to perform operations as defined by the stored instructions. In a general computer system the control module is a microprocessor which could be any commercially available processor of which x86 processors from Intel and 680X0 series from Motorola are examples. The computing system could be a single processor system or may use two or more processors on a single system or over a network. This control module also controls the functioning of the other components of the computing system (not shown). Control module (1.3) accesses said memory (1.4) through system bus (1.2) that interconnects the parts of the computing device. The control module executes a program called the operating system for the basic functioning of the computer system. The examples of operating systems are UNIX, WINDOWS and DOS. These operating systems allocate the computer system resources to various programs and help the users to interact with the system. Memory (1.4) helps the microprocessor in its functioning by storing instructions and data during its execution. Examples are random access memory such as dynamic random access memory (DRAM) or static memory (SRAM). Fixed Disk (1.5) is used to hold the data and instructions permanent in nature like the operating system and other programs. Display Adapter (1.6) is used as an interface between the system bus and the display device (1.7), which is generally a video display such as a monitor. The network interface (1.8) is used to connect the computer with other computers on a network which can be either a Local Area Network (LAN) or a Wide Area Network (WAN) or any other type of computer network, through wired or wireless means. Through the same networking interface, the computer system can also connect to the Internet. The computer system might also contain a sound card (1.9). The system is connected to various input devices like keyboard (1.10) and mouse (1.11) and output devices like printer (1.12). Various configurations of these subsystems are possible. It should also be noted that a system implementing the present invention might use less or more number of the subsystems than described above.

In the preferred embodiment of the invention, the instructions are stored on the storage device (1.5) in the form of a computer program. This program contains coded instructions for different modules and tools and libraries described herein the specification. On running the program, the instructions are transferred to the memory (1.4) and the microprocessor (1.3) executes the instructions. The system can be manually controlled by giving instructions through means of input devices such as keyboard (1.11) and mouse (1.12). All the instructions whether from the program or from the user input go to the memory (1.4) and are subsequently acted upon by the microprocessor (1.3). It should be understood that the invention is not limited to any particular hardware comprising the computer system or the software running on it.

Those of ordinary skill in the art will appreciate that the various means for generating service requests by the clients and their processing by the server are instructions for operating on the computing system. The means are capable of existing in an embedded form within the hardware of the system or may be embodied on various computer readable media. The computer readable media may take the form of coded formats that are decoded for actual use in a particular information processing system. Computer program means or a computer program in the present context mean any expression, in any language, code, or notation, of a set of instructions intended to cause a system having information processing capability to perform the particular function either directly or after performing either or both of the following:
  a) conversion to another language, code or notation
  b) reproduction in a different material form.

The depicted example in FIG. 1 is not meant to imply architectural limitations and the configuration of the incorporating device of the said means may vary depending on the implementation. Any kind of computer system or other apparatus adapted for carrying out the means described herein can be employed for practicing the invention. A typical combination of hardware and software could be a general purpose computer system with a computer program that when loaded and executed, controls the computer system such that it carries out the means described herein. Other examples of the incorporating device that may be used are notebook computers or hand held computers, PDAs etc.

An application uses one or more reusable modules, which implement a set of predetermined exceptions and exception handlers, to accomplish its task. However, it may want to extend/change the exception-handling behavior of these modules. In order to achieve this, the application provides the new exception handler code to the module. This code overrides the exception handler code present in the module enabling the extension/modification of the exception-handling behavior.

Figure 2:
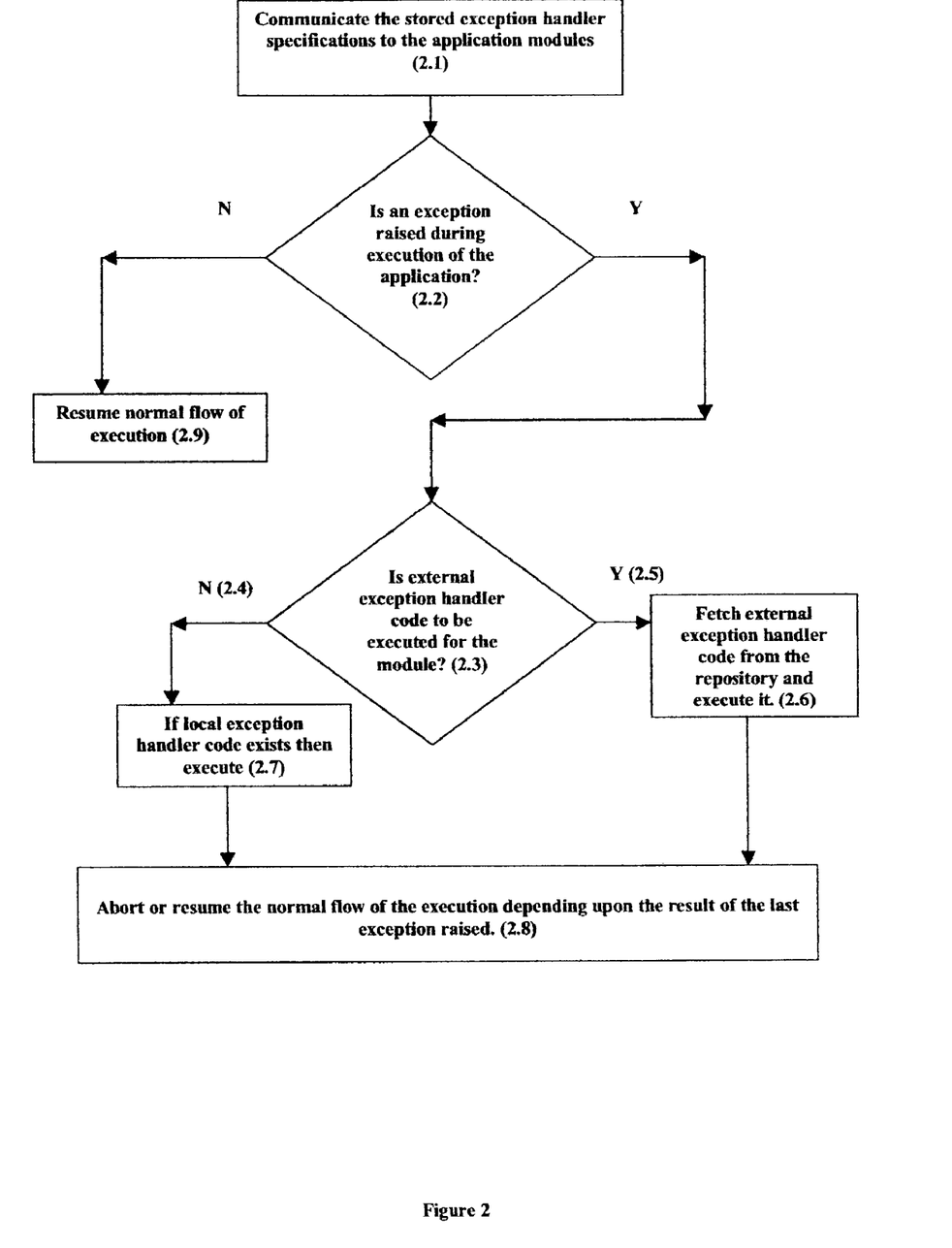
FIG. 2 is a flowchart explaining the process of Dynamic Exception Handling.

FIG. 2 shows the method of Dynamic Exception Handling. An application uses one or more modules that might have their own local Exception Handlers. To override the default behavior of Local Exception Handlers, external Exception Handlers can be developed and deployed with the application module. The External Exception Handlers are stored in a repository external to the application along with their specifications. The Exception Handling Specifications (EHS) are communicated to the modules (2.1) before/while an application is executed. These specifications have details about the Exception type that the Application wants to override. While execution of the application module if an exception is raised (2.2), it is checked whether an External Exception Handler code is defined for the raised Exception Type (2.3). If there exists any match between the raised Exception Type and the registered External Exception handler (2.5), the external exception handler code is downloaded from the Exception Handler Repository (2.6), if the same is not already available in the local cache. The downloaded external Exception Handler code is then executed and the execution flow is resumed back with the module (2.8). At the same time the exception handler code is stored in the local cache for any future use. If no External Exception Handler is defined (2.4) for the raised Exception Type, local Exception Handler is invoked, if the same exists for the exception raised (2.7) and the execution flow is resumed with the Module (2.8). If local Exception Handler is not defined for the raised Exception type, the exception is thrown back to the Application. An application executes normally till the time no exception is raised (2.9).

Figure 3:
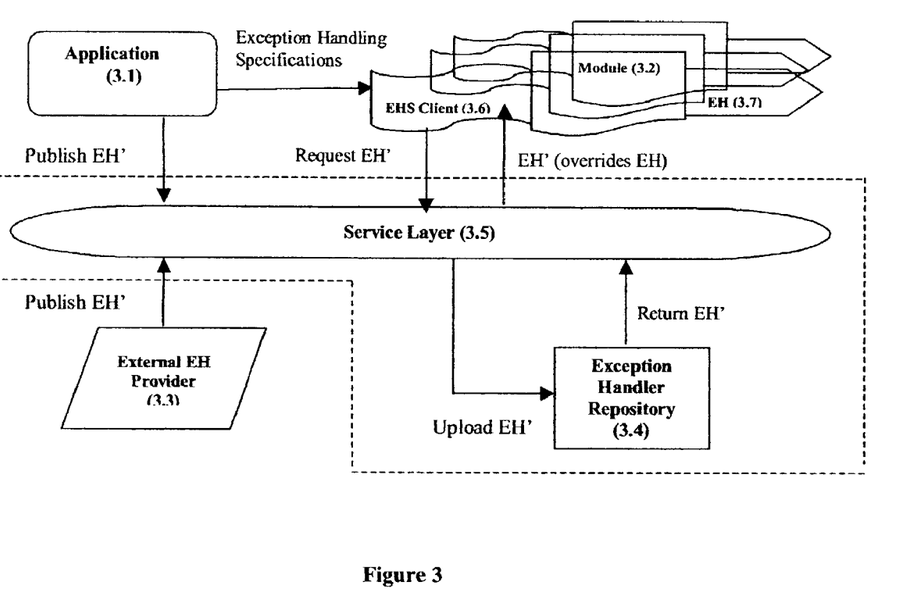
FIG. 3 shows the architecture of the preferred embodiment of the invention.
Figure 4:
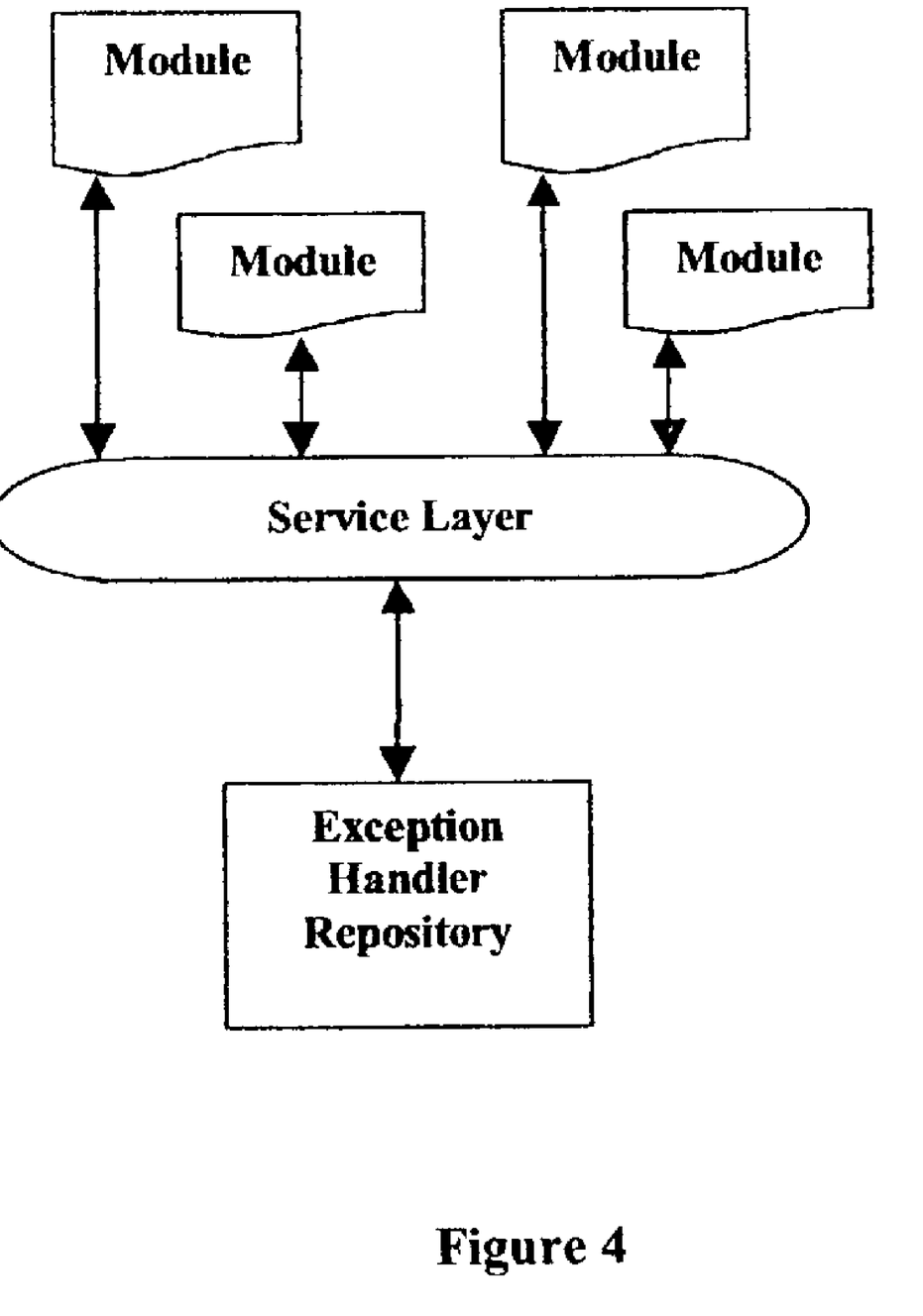
FIGS. 4, 5, 6, 7 and 8 depict alternate embodiments of the invention.

FIG. 3 depicts the architecture of the preferred embodiment of the invention. In the figure we have following components:

1. An Application (3.1) is software that takes the services of external modules. These modules can be deployed locally or remotely to the Application.
2. A Module (3.2) is software that provides certain logical processing and may accept some input data and can produce some useful output for the Application client. The Module may throw back certain Exceptions (uncaught) that it cannot handle to the Application client and may handle certain other Exceptions (caught) by using the local Exception Handler Code (EH) depending on the logic and business requirements. These Exceptions (both caught and uncaught) are published by the Module for simplifying the process of defining new Exception Handling behavior by the Application. An Application may define workflow over these Modules and various workflow engines can execute the control and data flow over the defined Modules.
3. External Exception Handler (EH) Provider (3.3) provides customized reusable External Exception Handler code.
4. Exception Handler Repository (3.4) provides persistence and search capability for External Exception Handler code.
5. Service Layer (3.5) provides interface to Application (3.1), Modules (3.2) and EH Provider (3.3) and allows them to search, download or upload External Exception Handler code (represented as EH' in the figure). The Service Layer may either provide remote access to Exception Handlers i.e. an interface to invoke Exception Handler code remotely or alternatively the Service layer can assist transferring the Exception Handler code to the remote Module (3.2).
6. Exception Handler Service Client (EHS Client) (3.6) is an exception handling framework library deployed with the Module (3.2) and is responsible to search, download and execute the appropriate EH (3.7) from EH Service layer (3.5).

7. Exception Handler (EH) (3.7) is a software code encapsulating exception-handling logic. The EH code is invoked whenever there is an exception while executing the Module (3.2). EH (3.7) can be developed to handle any generic Exceptions occurring anywhere in the module or can specifically be developed for certain exception types occurring in a particular method of a particular Class (software code).

Using the above components, the basic functioning of Dynamic Exception Handling is achieved in the following steps:

1. An Application (3.1) queries the Module, using appropriate communication and interfacing details (e.g. SOAP, RMI etc), for its published Exception Handling details (both caught and uncaught exceptions) and may choose to override some of these declared Exceptions by its custom Exception Handler code. The custom EH code (EH') can either be provided by the third party EH Provider (3.3) (and is uploaded in the repository) or the Application (3.1) may choose to develop its own custom EH code and upload it with the EH Service Layer (3.5) prior to invoking the Module (3.2).
2. An Application may override the default EH for caught Exception types and defines new EH for uncaught Exception types by passing the exception handling specifications (containing exception types and corresponding exception handler names with its access details) to the Modules (3.2).
3. When an exception occurs in the Module, the EHS Client checks its details with the Exception Handling specification supplied by the Application. If the exception type is declared to be overridden by the Application in the exception handling specification, the EHS Client (3.6) fetches the corresponding exception handler from the repository with the help of EH Service layer (3.5) (SOAP/JINI etc) and executes it locally (JIM/SOAP) or remotely (RMI).

The basic components of the invention that are present in all the embodiments in one way or the other are as follows:

1. The 'Exception Handler Repository' (3.4) stores exception handlers. It is populated by the Application (3.1) or by the external exception handler provider (3.3). The exception handlers are associated with logical names by which they can be queried and accessed from the Repository.
2. The Application is an entity that makes use of one or more modules (3.2) to accomplish its tasks. The Application can override the exception handling capability of the Modules by using the Exception Handlers deployed with Exception Handler Repository. It is the responsibility of the External EH Provider (3.3) or the Application (3.1) to develop and deploy the code of the handler (EH') to the EH repository. The Application provides the exception handling specifications to the EHS Client. The exception handling specifications contain information about each overriding exception and the corresponding Exception Handler. The specification may also contain access and communication details to EH Repository to search and download the EH code or alternatively to invoke it remotely.
3. The Service Layer (3.5) provides a platform for communication among the different entities in the system. The External EH Provider (3.3) or an Application (3.1) uploads the exception handler to the EH Repository using the Service Layer. The Service Layer allows interaction between the EH Repository and the Module. It also provides a mechanism for the EHS Client (3.6) to search the EH Repository. The EH Repository is internal to the Service Layer and can be accessed through suitable interfaces. JVM, JINI/RMI, WAS or any other distributed infrastructure technology that connects software components can also be used as the Service Layer.
4. Each Module (3.2) of the application may or may not have its own Exception Handler (3.7), which can be overridden. The Application ships exception-handling specifications to EHS Client. EHS Client communicates with the EH Repository via the Service Layer to download the EH code. Once the EHS Client has the exception handler code and the exception handler specifications, it overrides the exception handler class or method in the module with the code obtained from the EH Repository. Thus, the EHS Client knows the protocols for communicating with the different entities and thereby avoids this overhead for the Module writer.

FIGS. 4, 5, 6, 7 and 8 show alternate embodiments of the invention. In the embodiment shown in FIG. 4, the Service Layer is provided by a distributed SOA (Service-Oriented Architecture) framework such as JINI, SOAP or RMI.

Figure 5:
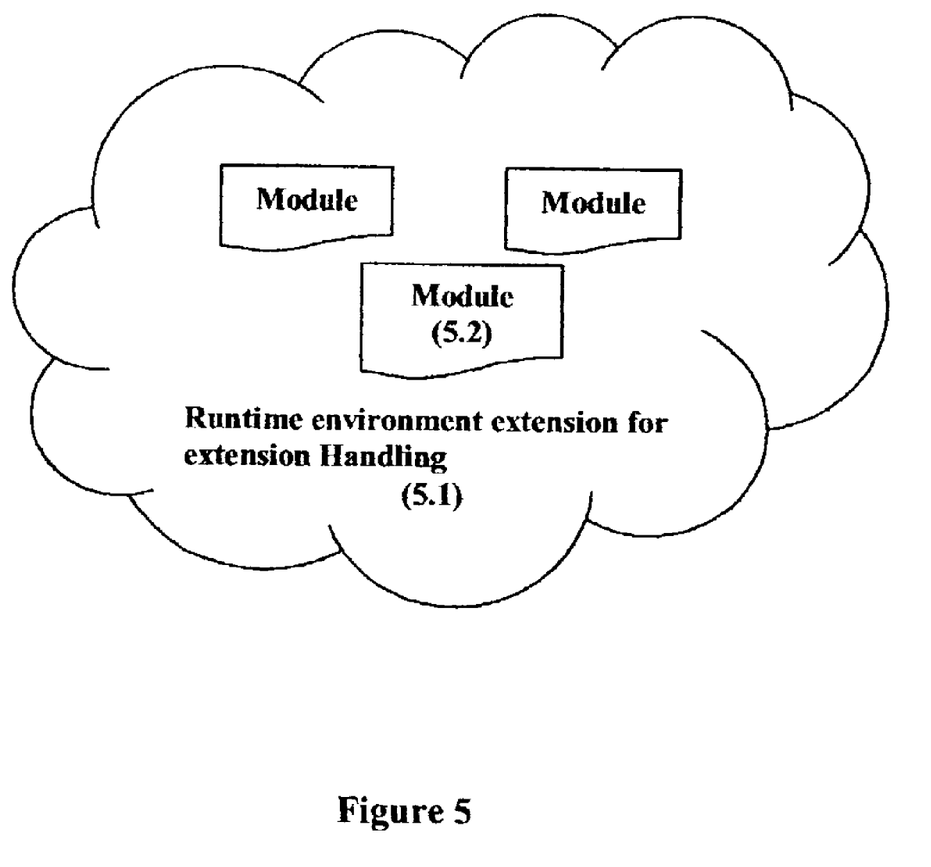

In another embodiment as shown in FIG. 5, the service layer is centralized in a common Java Virtual Machine (JVM, 5.1) and all the modules (5.2) run locally. In such a scenario, depending on the type of changes made to the JVM, there may or may not be a need for the EHS Client as the functionality can be incorporated directly into the JVM.

Figure 6:
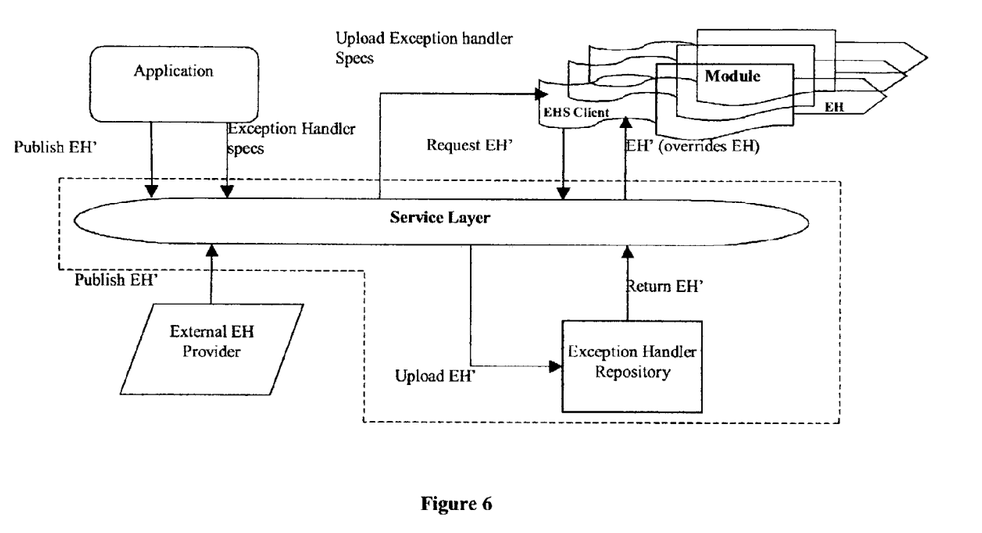

In yet another embodiment of the invention as depicted in FIG. 6, the exception handling specifications are communicated to the EHS client via the service layer. In such a case there will be no direct connection between the Application and the EHS Client.

This architecture facilitates decoupling of the EHS client and the Module thereby making it possible for them to be located at remote locations.

Figure 7:
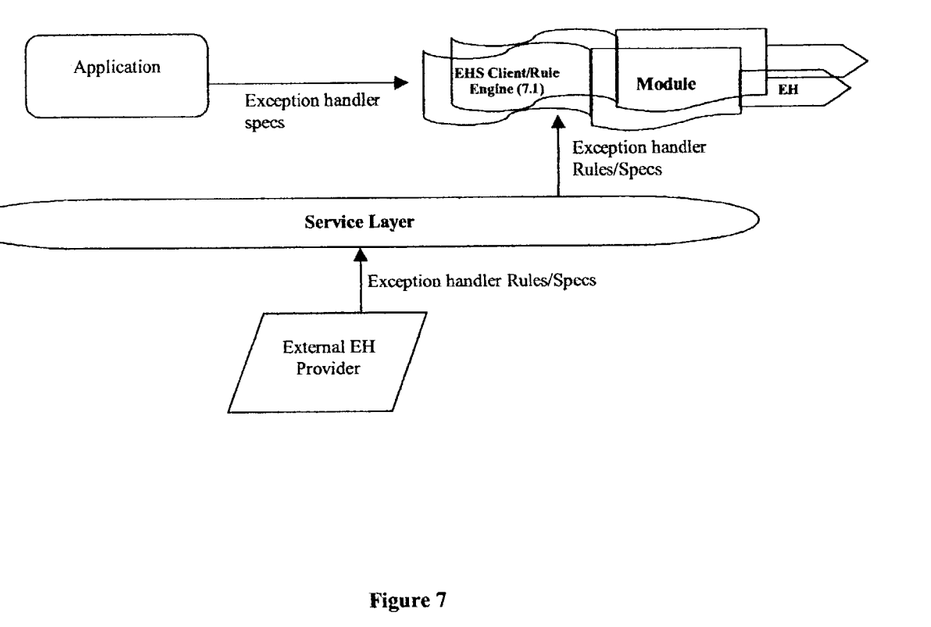

An embodiment of the invention can also exist as shown in FIG. 7, wherein the exception handler specifications can be rules and the EHS client could be a rule execution engine (7.1).

Figure 8:
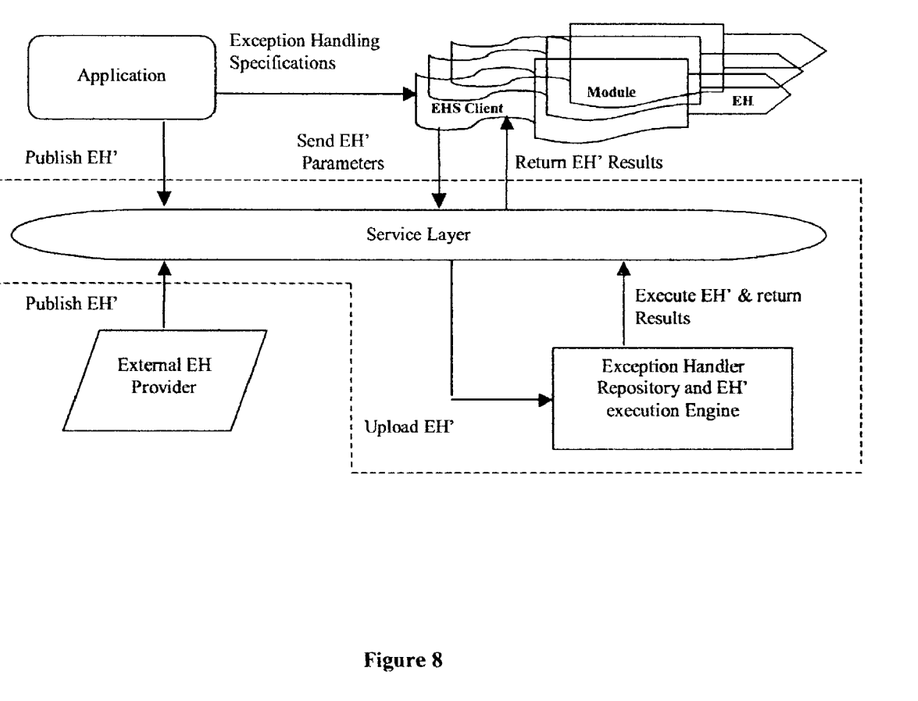

In the embodiment shown in FIG. 8, the exceptions are handled by EHS Client sending Exception Parameters and receiving Exception Handling results with respect to those parameters in response.

Another embodiment of the invention can exist in which the Exception Handler repository could store rules and the EHS client could be a rule-execution engine.

In another embodiment of the invention, the exception handling specifications could be rules and the rule execution engine could be located remotely. In such a scenario, the EHS Client will have to send the rules to the rule execution engine and get back the code from the remote location.

In another embodiment of the invention, the exception handler specifications can be communicated to the EHS Client in terms of a markup language. In this form of the invention, there could be an Exception Markup Language that captures all the details of the exception types, location, exception handlers, exception handler logical name, etc.

In another embodiment of the invention, the application/external exception handler provider could directly communicate the exception handler code to the EHS Client. Hence there will be no need for the Exception Handler Repository.

In yet another embodiment of the invention, there can be no distinction between the module and the application. The module can itself be visualized as an application. In such a scenario, the module itself will specify the EH Specifications to the EHS Client. An external provider could populate the Exception Handler Repository. In this form of the invention, any program that may not consist of modules can change its exception-handling behavior at runtime.

The aforementioned method can be implemented using the above basic components in different architecture to achieve different functionalities within the purview of Dynamic Exception Handling like exception translation based on the needs of security, user of the application etc., language independence in exception handling, runtime alteration of application without modifying the source code and other advantages that are achieved by deploying loosely coupled exception handlers.

It will be apparent to those with ordinary skill in the art that the foregoing is merely illustrative and not intended to be exhaustive or limiting, having been presented by way of example only and that various modifications can be made within the scope of the above invention. For example only the relevant Exception Handler specification may be communicated to the respective application modules or instead of having one central repository there can be several repositories amongst which an intelligent EH Manager can decide depending upon the requirement. The present invention can be realized in hardware, software or a combination of hardware and software. The modules as described in the invention could either be realized in a centralized manner, on one computer system, or could be spread across several interconnected computer systems. Any kind of computer system or other apparatus adapted for carrying out the methods described herein is suited. A typical combination of hardware and software could be a general-purpose computer system with a computer program that, when loaded and executed, controls the computer system such that it carries out the methods described herein.

Accordingly, this invention is not to be considered limited to the specific examples chosen for purposes of disclosure, but rather to cover all changes and modifications, which do not constitute departures from the permissible scope of the present invention. The invention is therefore not limited by the description contained herein or by the drawings, but only by the claims.

What is claimed is:

1. A method for enabling configurable dynamic exception handling absent support from an operating system and modification of programming language, said method comprising:
   maintaining external exception handlers for desired exceptions, independent of modules raising the exceptions;
   maintaining said external exception handlers in at least one exception handler repository;
   updating said exception handler repository independent of an execution of said modules raising said exceptions; and
   dynamically binding a selected external exception handler to each desired exception based on requirements of an application being serviced by the modules;
   wherein the step of dynamically binding is enabled by providing exception handler specifications together with each exception handler, to map required exception handlers with the exceptions in the modules; and
   wherein the modules are accessed by the application through an exception handler client wrapper that handles all application requests and processes required exceptions of the module using an exception handler code in said exception handler repository.

2. The method of claim 1, wherein the exception handler specifications determines each overriding exception, overridden exception in the modules, and accesses details of a corresponding handler code in said exception handler repository.

3. The method of claim 1, wherein the exception handler specifications are communicated to the application using a service layer.

4. The method of claim 1, wherein the nodule delegates handling of desired exceptions to an exception handler client that processes required exceptions, of a module using an exception handler code in said exception handler repository.

5. The method of claim 1, wherein the modules query an exception handler client for obtaining the exception handler specifications and processes required exceptions of the module using an exception handler code in said exception handler repository as determined by the exception handler specifications.

6. The method of claim 1, wherein an exception handler code is cached after it has been fetched from said exception handler repository.

7. The method of claim 1, wherein the exception handler repositoiy resides at any of a local location and a remote location.

8. The method of claim 1, wherein the exception handler and specifications of said exception handler are updated in the exception handler repository using at least one external application specific exception handler provider.

9. The method of claim 8, wherein new exception handlers are dynamically plugged in.

10. A system for enabling configurable dynamic exception handling absent support from an operating system and modification in programming language, said system comprising:
   a first device operable for maintaining external exception handlers for desired exceptions, independent of modules raising the exceptions;
   said first device comprising at least one exception handler repository wherein said first device is adapted to update said exception handler repository independently of an execution of the modules raising the exceptions; and
   a second device operable for dynamically binding a selected external exception handler to each desired exception based on requirements of an application being serviced by the modules;
   wherein said second device comprises exception handler specifications together with each exception handler, to map required exception handlers with the exceptions is the modules; and
   wherein the modules are accessed by the application through an exception handler client wrapper that handles all application requests and processes required exceptions of the module using an exception handler code in said exception handler repository.

11. The system of claim 10, wherein the exception handler specifications determines each overriding exception, overridden exception in the modules, and accesses details of a corresponding handler code in said exception handler repository.

12. The system as claimed in claim 10, wherein the exception handler specifications are communicated to the application using a service layer that also acts as a platform for interaction between the various entities of the system.

13. The system of claim 12, wherein the service layer is centralized as a virtual machine including Java Virtual Machine (JVM) in which all the modules run locally.

14. The system of claim 13, wherein the virtual machine includes a functionality of an exception handler service client.

15. The system of claim 10, wherein the module delegates handling of desired exceptions to an exception handler client that processes required exceptions of a module using an exception handler code in said exception handler repository.

16. The system of claim 10, wherein the modules query an exception handler client for obtaining the exception handler specifications and processes required exceptions of the module using an exception handler code in said exception handler repository as determined by the exception handler specifications.

17. The system of claim 10, further comprising a unit operable to cache an exception handler code after it has been fetched from said exception handler repository.

18. The system of claim 10, wherein the exception handler repository resides at any of a local location and a remote location.

19. The system of claim 10, wherein the external exception handler is associated with logical names, wherein an exception handler service queries said logical names.

20. The system of claim 10, wherein the exception handler specifications are communicated to an exception handler service client using a markup language.

21. The system of claim 10, wherein the exception handler specifications are implemented as rules being stored in any of an exception handler service client and said exception handler repository.

22. The system of claim 21, wherein the exception handler service client comprises any of a rule execution engine and a specific rule execution engine, wherein said rule execution engine and specific rule execution engine are located at any of a local and remote location in communication with the exception handler service client.

23. The system of claim 10, wherein the modules are located within the application and the application includes exception handler specifications that are internally communicated to an exception handler service client.

24. The system of claim 10, wherein the application and the modules reside on a computing system, said computing system comprising:

a system bus;

a communications unit connected to the system bus;

a memory unit including a set of instructions connected to the system bus; and a control unit executing the set of instructions in the memory unit.

25. The system of claim 10, wherein said system is connected to complementary systems, wherein said complementary systems comprise the modules to complement and supplement existing modules of said system.

26. A computer program product comprising computer readable program code stored on a computer readable storage medium embodied therein for performing a method for enabling configurable dynamic exception handling absent support from an operating system and absent support from a programming language, said method comprising:

maintaining external exception handlers for desired exceptions, independent of modules raising the exceptions;

maintaining said external exception handlers in at least one exception handler repository;

updating said exception handler repository independent of an execution of said modules raising said exceptions; and dynamically binding a selected external exception handler to each desired exception based on requirements of an application being serviced by the modules;

wherein said step of dynamically binding comprises providing exception handler specifications together with each exception handler, to interface between required exception handlers and exception raising modules; and wherein the modules are accessed by the application through an exception handler client wrapper that handles all application requests and processes required exceptions of the module using an exception handler code in said exception handler repository.

\* \* \* \* \*